Aug. 9, 1960
F. BRAVENEC ET AL
2,948,847
ELECTROMAGNETIC CONDUCTIVITY DETECTION
Filed May 3, 1957
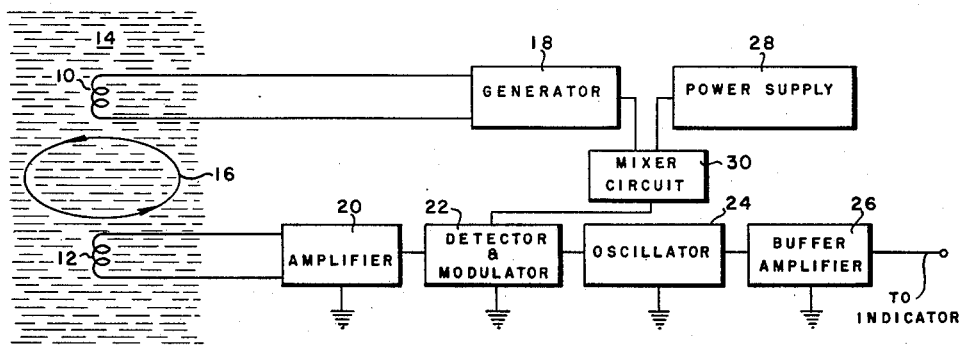
FIG. 1.
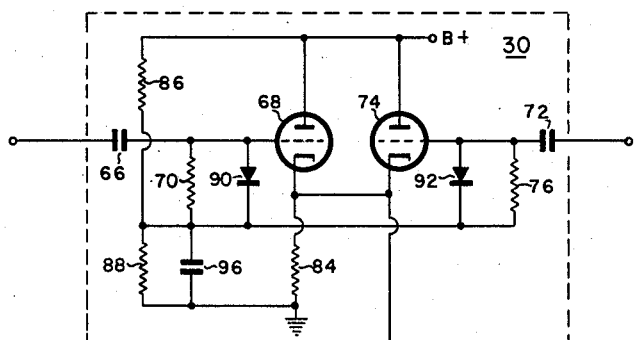
FIG. 2.
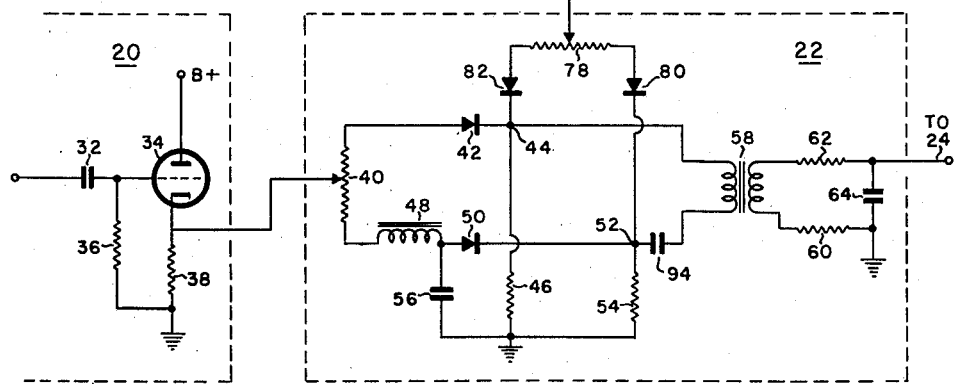
INVENTORS.
FRANK R. BRAVENEC,
RICHARD H. HUDDLESTON JR
BY
*James M. Peppers*
AGENT.

United States Patent Office 2,948,847
Patented Aug. 9, 1960

2,948,847
ELECTROMAGNETIC CONDUCTIVITY DETECTION

Frank Bravenec and Richard H. Huddleston, Jr., Houston, Tex., assignors, by mesne assignments, to Welex, Inc., a corporation of Delaware Filed May 3, 1957, Ser. No. 656,876

8 Claims. (Cl. 324—30)

This invention generally relates to systems for detection and indication of the electrical conductivity of conductive media and more particularly relates to means for detection of electrical currents induced in such media.

As is known, the electromagnetic field produced by an energized transmitter coil, when immersed in a conductive medium, will produce eddy currents in the medium having paths concentric with the transmitter coil. If a second coil, designated as a receiver coil, is then introduced in spaced and axial relation to this energized transmitter coil, there will be a composite voltage induced in the second coil. One component of this composite voltage is that directly induced by the transmitter field which will be in quadrature (90° or 270°) with respect to the transmitter coil current. The other component is that induced by the secondary eddy current field which will be in phase (0° or 180°) with respect to the transmitter coil current. The composite induced voltage will therefore have phase characteristics determined by the relative magnitudes of the directly induced and the secondarily induced component voltages.

Upon establishment of a constant electromagnetic field of fixed frequency, the magnitude of such eddy currents will then be a function of the conductivity of the surrounding medium. The resulting in-phase voltage component of the composite induced voltage will then also be a function of the conductivity of the surrounding medium. Thus, a measure taken of this in-phase component of induced voltage will be a direct indication of such conductivity.

However, since the voltage induced in the receiver coil is a composite of both components, it is necessary to separate and detect the in-phase component, often of small magnitude in comparison to the primary component, for accurate indication of such conductivity.

It is therefore the general object of this invention to provide an apparatus which is suitable for simultaneous detection of such a desired voltage component and modulation of associated signal transmission and indication equipment which has the features of direct coupling and single ended inputs.

It is a further object of this invention to provide a voltage component detection apparatus which has a minimum of critical bridge type adjustments and which is essentially independent of induced and supply voltage stability.

Briefly described, the invention has means adapted to produce a constant electromagnetic flux field and a selectively spaced induction means adapted to produce a voltage in response to said electromagnetic field and in response to a secondary field established by any surrounding eddy currents produced by said electromagnetic field. A synchronous detection and modulation means is provided which detects only the component of said voltage which is induced by said eddy currents. Said detection means is adapted to be supplied with a first voltage of like frequency and preselected amplitude and phase relation the current supplied to said field generating means. Said detection means is also adapted to be supplied with a second voltage of lower frequency required to modulate a frequency modulated transmission means. Said detection means comprises a first circuit having a first and a second conductor being adapted to commonly convey a direct current superimposed with an alternating current, each of said conductors being respectively connected to a first and a second measuring terminal. A first resistance is connected between said first terminal and a current return and a second resistance is connected between said second terminal and said current return. A first rectifier means is connected in first conductor which is adapted to pass said direct current. A second rectifying means is connected in said second conductor which is adapted to pass said direct current and a filtering means is connected in said second conductor which is adapted to filter out said superimposed alternating current. A second circuit is also provided having a third and a fourth conductor adapted to commonly convey said first voltage and said second voltage. Said third and fourth conductors are respectively connected to said first and second terminals. A third rectifying means is connected in said third conductor adapted to pass said first and second voltages in one direction of flow. A fourth rectifying means is connected in said fourth conductor adapted to pass said first and second voltages in said one direction of flow. A means connected across said first and second terminals is provided to modulate said transmission means in response to said second voltage variation occurring across said terminals.

For more detailed explanation of the invention, and for further objects and advantages thereof, reference may now be had to the following description taken in conjunction with the drawing in which:

Figure 1 is a schematic view of one embodiment of the present invention.

Figure 2 is a schematic embodiment of a novel circuit provided by this invention.

Now referring to Figure 1 of the drawing, there is illustrated a conductivity detection system having an electromagnetic field generator coil 10 provided in spaced relation to a receiver coil 12. Both of said coils 10 and 12 are immersed in a medium 14 for which the detection of conductivity is desired. The field produced by generator 10 induces eddy currents in the medium 14 which will be concentric with and about the axis of generator coil 10. The path of such eddy currents are generally illustrated at 16.

A composite voltage is induced in receiver coil 12, one component being that directly induced by the flux field produced by generator coil 10, the other component being that induced by the secondary flux field produced by the eddy current 16. The voltage induced in receiver coil 12 will thus be of the same frequency as impressed on generator coil 10.

With a constant flux field being generated by generator coil 10, any variation of the eddy currents 16 will be directly responsive to the conductivity of the medium 14. The voltage component induced in coil 12 by the flux field of such eddy currents will thus be a direct indication of said conductivity.

Generator coil 10 is powered by a constant current generator 18 at any desired frequency, herein exampled as being 20 kc.

The voltage induced in receiver coil 12 is fed through an amplifier 20, having a cathode follower included as later described, into a synchronous detecting and modulating circuit 22. The output of detector and modulator 22 modulates the center carrier frequency of a frequency modulated transmitter oscillator 24. The output frequency modulated signal of oscillator 24 feeds through a buffer amplifier 26 to a remote signal discrimination and indicating means (not shown).

Since such frequency modulated transmission and receiving means are well known and presently used, further description of such is not herein contained. Reference may be had to Patent No. 2,573,133 to Greer for further clear description and illustration of such equipment.

As illustrated, voltages of substantially square wave configuration are supplied from 20 kc. generator 18 and a low frequency power supply 28, herein exampled as 200 cycles, for introduction into detector 22 through a mixer circuit 30. The 20 kc. voltage supplied to detector 22 is of the same phase relation as the in-phase component of the voltage induced in receiver coil 12 since that component is representative of the eddy currents 16. However, this voltage could be supplied to detector 22 at other phase relations if other components of the voltage induced in receiver coil 12 were desired.

When in operation as illustrated, the in-phase voltage component induced in receiver coil 12 in response to the eddy currents 16 is detected by detector 22 and converted into an amplitude modulated signal of a frequency determined by power supply 28, herein exampled as 200 cycles. This 200 cycle signal modulates the center frequency of oscillator 24, herein exampled as 22 kc., in response to the magnitude of the detected component voltage.

Detector 22 is illustrated in Figure 2 as being inclosed by dashed lines separating said detector from mixer circuit 30 and amplifier 20, also inclosed by dashed lines. As illustrated, the induced signal from receiver coil 12 is amplified by amplifier 20 and impressed through a capacitor 32 to the grid of a normally conducting triode 34 which, with the illustrated circuitry at 20, comprises the previously described included cathode follower. The grid of triode 34 is connected through a resistor 36 to ground and the cathode of triode 34 is connected through a resistor 38 to ground. The cathode of triode 34 is also connected to the mid-positioned tap of a potentiometer 40 which forms a part of detector 22. It is seen that normal conduction of triode 34 through resistor 38 will cause a direct current potential to appear at potentiometer 40. The amplified voltage from receiver coil 12 to the grid of triode 34 will produce a like alternating current voltage to be superimposed upon the direct current.

One terminal of potentiometer 40 is connected through a branch circuit including a diode 42 to a terminal 44. Terminal 44 is connected through a resistance 46 to ground. The other terminal of potentiometer 40 is connected through another branch circuit including a filtering inductance 48 and a diode 50 to a terminal 52. Terminal 52 is connected through a resistor 54 to ground. Connection is made between inductance 48 and diode 50 to ground through a capacitor 56.

As illustrated, terminals 44 and 52 are connected across the primary of a transformer 58. A capacitor 94 is connected in series with said primary. One terminal of the secondary of transformer 58 is connected through a resistor 60 to ground. The other terminal of said secondary is connected through a resistor 62 to frequency modulated oscillator 24. Connection is made between resistor 62 and oscillator 24 to ground through a capacitor 64.

As illustrated, square wave voltages are supplied from generator 18 and power supply 28 to detector 22 through a mixer circuit 30. The voltage from generator 18 is introduced into mixer circuit 30 through a capacitor 66 to the grid of a normally conducting triode 68. The grid of triode 68 is connected through a resistor 70 and a diode 90 to a positive biasing source. Said source is provided at the junction of voltage dividing resistors 86 and 88 which are connected from said B+ source to ground. A capacitor 96 is connected from the junction of resistors 86 and 88 to ground. The plate of triode 68 is connected to said B+ source and the cathode of triode 68 is connected through a resistor 84 to ground.

Voltage from power supply 28 is introduced into mixer circuit 30 through a capacitor 72 to the grid of a normally conducting triode 74. The grid of triode 74 is connected to said positive biasing source through a resistor 76 and a diode 92. The plate of triode 74 is connected to said B+ source and the cathode of said triode is also connected through resistor 84 to ground. The cathodes of both triodes 68 and 74 are connected to the mid-positioned tap of a potentiometer 78 which forms a part of detector 22.

One terminal of potentiometer 78 is connected through a branch circuit including a diode 80 to measuring terminal 52. The other terminal of potentiometer 78 is connected through another branch circuit including a diode 82 to measuring terminal 44. As illustrated, a current passing through the tap of potentiometer 78 may equally flow through diodes 80 and 82. Any differences in forward resistance of diodes 80 and 82 may be compensated by adjustment of potentiometer 78. However, such adjustment has not been found to be necessary in actual practice.

In operation, generator 18 supplies a constant current through generator coil 10, thus establishing a constant electromagnetic flux field about coil 10 in the medium 14. This flux field induces eddy currents, as are illustrated at 16, to such extent permitted by the conductivity of the medium. Thus, a variation in the conductivity of medium 14 will result in variation of eddy currents 16. A composite voltage is thereon induced in receiver coil 12, one component of which is a quadrature voltage directly induced by the flux field of generator coil 10 and the other component of which is an in-phase voltage induced by the secondary flux field of eddy currents 16.

The composite voltage induced in receiver coil 12 is amplified by amplifier 20 and impressed on the grid of the cathode follower included in amplifier 20. As seen in Figure 2, this amplified composite voltage is introduced through capacitor 32 to the grid of normally conducting triode 34. The voltage variation on the grid of triode 34 superimposes a like pulsating ripple frequency upon the direct current voltage established across resistor 38.

This rippling direct current voltage passes from the cathode of triode 34 to the tap of potentiometer 40. From potentiometer 40 there are two parallel conducting paths present, one being through the upper portion of potentiometer 40, diode 42 and resistor 46 to ground. The other path is through the lower portion of potentiometer 40, inductance 48, diode 50 and resistor 54 to ground.

Since the voltage input to potentiometer 40 has a positive direct current level with respect to ground, diodes 42 and 50 present a very low impedance to current flow. Also, resistors 46 and 54, which are preferably of equal value, should have a relatively high resistance, an example being 20,000 ohms. It may then be seen that the low forward resistance of diodes 42 and 50 is very small in comparison to the total series resistance in each parallel circuit and will thus contribute very little instability to the system. It is also pointed out that any unbalance of current flow may be corrected by adjustment of potentiometer 40 if such exists. However, as with potentiometer 78, such unbalance has been found to be so small in actual practice that potentiometer 40 may be omitted.

Inductance 48 essentially has no direct current resistance. Therefore, direct current through resistors 46 and 54 may be identical, permitting a zero direct current potential between terminals 44 and 52.

The 20 kc. ripple frequency, superimposed on the direct current from triode 34 cathode, appears unchanged at terminal 44. However, the superimposed ripple frequency is attenuated, due to the filtering action provided by inductance 48 and capacitor 56, and does not appear at terminal 52. The original 20 kc. alternating current signal thereupon appears across terminals 44 and 52 at the same phase relation and frequency as when induced in receiver coil 12. The 20 kc. voltage then produced through transformer 58, in the absence of other voltages at terminals 44 and 52, will be filtered, by the action of resistors 62 and 60 in combination with capacitor 64, to an essentially zero voltage.

If, however, coincident with the above operation, a second 20 kc. gating voltage of symmetrical square wave configuration and of positive peak value greater than the direct current voltage introduced at potentiometer 40 is applied through diodes 80 and 82, diodes 80 and 82 will conduct and diodes 42 and 50 will cease to conduct. During the positive conduction period through diodes 80 and 82, the voltage drop across resistors 46 and 54 will then again be equal and a zero potential difference will result between terminals 44 and 52. However, during the negative period of such 20 kc. gating voltage, diodes 80 and 82 will cease to conduct and diodes 42 and 50 will conduct as previously described.

Then, if the 20 kc. gating voltage introduced through potentiometer 78 is in phase with the 20 kc. ripple voltage introduced through potentiometer 40, the positive period of such ripple voltage will be gated out by the voltage from mixer 30 and the negative period would appear across the terminals 44 and 52. This negative period of the 20 kc. ripple voltage appearing at terminals 44 and 52, if filtered, would produce a corresponding filtered direct current of negative potential across said terminals. Also, if the 20 kc. gating voltage through potentiometer 78 were at quadrature with respect to the ripple voltage appearing though diode 42, it is seen that the ripple voltage would be gated out through an equal portion of the positive and negative periods of alternation and the voltage thus produced across terminals 44 and 52 would, if filtered, be zero.

It is pointed out that the 20 kc. voltage appearing across terminals 44 and 52 from potentiometer 40 will have a phase relation to the voltage from generator 18 which is determined by the relative magnitudes of the in-phase and quadrature voltage components induced in receiver coil 12. Since the gating voltage is in phase with the in-phase induced component, the negative alternation of such voltage component will be established which may be averaged to a potential at terminals 44 and 52 while the quadrature component would be averaged to zero. Thus the in-phase component of the induced voltage caused by the eddy currents 16 would result in an average potential proportionate to the magnitude of said eddy currents.

Now, when the gating signal appearing through potentiometer 78 is a composite of two frequencies, one being the 20 kc. gating frequency and the other being a gating signal of lower frequency suitable for modulation of oscillator 24, some means is required to mix such voltages for passage into detector 22.

As illustrated, a power supply providing an alternating current of square wave configuration and suitable modulating frequency, the example being 200 cycles, provides such lower frequency voltage into mixer circuit 30. As herein provided, this 200 cycle voltage enters mixer 30 through capacitor 72 to the grid of triode 74. This 200 cycle voltage variation on the grid of triode 74 creates a corresponding voltage to appear across resistor 84 which is introduced to potentiometer 78 of detector 22. The 20 kc. voltage from generator 18 enters mixer 30 through a capacitor 66 to the grid of triode 68. This voltage variation at the grid of triode 68 also causes a corresponding voltage to appear across resistor 84 which is also introduced to potentiometer 78.

Thus, at potentiometer 78 there appears a 200 cycle alternating current gating voltage the positive period of which passes through diodes 80 and 82 and creates an equal potential at terminals 44 and 52. During the negative period of this 200 cycle gating voltage, diodes 80 and 82 cease to conduct the 200 cycle gating voltage but continue to conduct the positive period of the 20 kc. gating voltage introduced by triode 68.

Then, when mixer 30 concurrently supplies detector 22 with the 20 kc. and 200 cycle voltages, the superimposed 20 kc. ripple voltage across terminals 44 and 52 will be cut off at a 200 cycle rate for alternate half periods and will be present at corresponding alternate 200 cycle half periods. The 20 kc. gating voltage thus introduced will establish the previously described average negative potential at terminals 44 and 52 during the 200 cycle alternate half periods that diodes 42 and 50 conduct. By proper choice of values for resistors 60 and 62 and for capacitor 64, the amplitude modulated 200 cycle frequency at the secondary will pass to oscillator 24 while the 20 kc. frequency will be averaged, as previously described.

Thus, appearing across the primary of transformer 58 is a 200 cycle voltage responsive to the magnitude of the in-phase component of the voltage induced in receiver coil 12.

The above described 200 cycle voltage output from detector 22 serves to modulate the center frequency of transmitter oscillator 24, the modulated frequency of which passes through an amplifier 26 to a remote receiving, descriminating and recording apparatus, as previously described.

It is thus possible to obtain simultaneous synchronous phase detection and modulation in a circuit of unusual stability. Since there are no time constants to balance and no significant sources of instability, common mode reduction and system balance in the order of 60 db is easily obtainable. It has been found that direct current voltage operating level changes of 20% in the connecting circuits produce no discernible effects in the balance thus established.

It is pointed out that either or both of potentiometers 40 and 78 may be omitted if an absolutely exact balance is not required.

It is also pointed out that the negative potential found at terminals 44 and 52, when the 20 kc. ripple voltage and 20 kc. gating voltage are concurrently supplied as previously described, could be averaged and indicated directly from these terminals if desired. In such case the power supply 28, the mixer circuit 30, and transformer 58 need not be provided. However, the invention has been found particularly useful, when provided as presently illustrated for remote indication of conductivity.

Also, if the 20 kc. frequency component is not objectionable in the output to oscillator 24, the filter composed of resistors 60 and 62 and capacitor 64 may be omitted with unaffected operation. Further, transformer 58 secondary may be either grounded, as illustrated, or isolated. Said transformer secondary may also be center tapped for push-pull operation if desired.

By means of the system as herein illustrated, the conductivity of a medium may be detected by measurement of the eddy currents produced therein by a constant electro-magnetic field. The invention may also be applicable to other detection services where a particular component of an alternating current signal is desired to be known.

Other modifications in detail of the system will be apparent to those skilled in this art. The system herein described is intended to serve as an illustration of one embodiment of the invention. Various changes may therefore be made without departing from the spirit of the invention or the scope of the annexed claims.

That which is claimed is:

1. In a system for the detection of conductivity having a transmitter means for producing an alternating electro-magnetic flux field of substantially constant magnitude in a surrounding medium whereby eddy currents will be established responsive to the conductivity of the said medium, a receiver means axially disposed apart from said transmitter means for producing a voltage induced by said flux field and also by a secondary flux field established by said eddy currents, and a detection and modulation means for detecting only that component of the receiver voltage representative of said secondary flux field and for modulating the center frequency of a frequency modulation transmission means, said detection and modulation means comprising, means in connection with said receiver means and a first circuit for superimposing said receiver voltage as an alternating ripple on a direct current voltage, said first circuit having a first and a second branch in respective connection with a first and second measuring terminal, a first and second resistance respectively connected between said terminals and a current return, a first and second rectifier means respectively connected into said first and second branches for passing current in one direction of flow, a filtering means connected into said second branch for filtering out said superimposed receiver voltage, a second circuit in connection with a source of alternating current voltage of like frequency and preselected phase relation to said receiver voltage and with a source of alternating current voltage of frequency proper for modulation of said transmission means, said second circuit having a third and a fourth branch in respective connection with said measuring terminals, a third and a fourth rectifying means respectively connected in said third and fourth branches for passing current in one direction of flow, and means connected across said terminals and in connection with said transmission means for producing a voltage of amplitude representative of the average receiver frequency voltage and of frequency of said modulating voltage.

2. A conductivity detection system comprising, a transmitter means for producing an alternating electromagnetic flux field of substantially constant magnitude in a surrounding medium whereby eddy currents will be established in said medium responsive to the conductivity thereof, a receiver means axially disposed apart from said transmitter means for producing a voltage induced by said flux field and also by a secondary flux field established by said eddy currents, a detection and modulation means for detecting only that component of the receiver voltage representative of said secondary flux field and for modulating the center frequency of a frequency modulation transmission means in response thereto, said detection and modulation means comprising, a first means in connection with said receiver means and a first measuring terminal for superimposing said receiver voltage as an alternating ripple on a direct current voltage including means for preventing current flow toward said receiver means, a second means in connection with said receiver means and a second measuring terminal for passing only said direct current voltage including means to prevent current flow toward said receiver means, said first and second measuring terminals being respectively connected through resistances to a current return, a first source of alternating current voltage of like frequency, preselected phase relation and greater amplitude than said receiver voltage, a second source of alternating current voltage of frequency proper for modulating said transmission means and of greater amplitude than said receiver voltage, a third and fourth means connected to both said voltage sources and respectively connected to said first and second measuring terminals including means to prevent current flow toward said sources, whereby current will flow to said terminals from said receiver means during negative alternation of both said source voltages and will cease to flow during the positive alternation of either of said sources, and means connected across said terminals and in connection with said transmission means for producing a voltage of modulating frequency and of amplitude representative of the average voltage of the receiver voltage component found across said measuring terminals.

3. In a system for the detection of conductivity having a transmitter means for producing an alternating electromagnetic flux field of substantially constant magnitude in a surrounding medium whereby eddy currents will be established responsive to the conductivity of the said medium, a receiver means axially disposed apart from said transmitter means for producing a voltage induced by said flux field and also by a secondary flux field established by said eddy currents, and a detection means for detecting only that component of the receiver voltage representative of said secondary flux field, said detection means comprising, means in connection with said receiver means and a first circuit for superimposing said receiver voltage as an alternating ripple of a direct current voltage, said first circuit having a first and a second branch in respective connection with a first and second measuring terminal, a first and second resistance respectively connected between said terminals and a current return, a first and second rectifier means respectively connected into said first and second branches for passing current in one direction of flow, a filtering means connected into said second branch for filtering out said superimposed receiver voltage, a second circuit in connection with a source of alternating current voltage of like frequency and preselected phase relation to said receiver voltage, said second circuit having a third and a fourth branch in respective connection with said measuring terminals, a third and a fourth rectifying means respectively connected in said third and fourth branches for passing current in one direction of flow, and means connected across said terminals for producing a voltage representative of said component of the receiver voltage.

4. A conductivity detection system comprising, a transmitter means for producing an alternating electromagnetic flux field of substantially constant magnitude in a surrounding medium whereby eddy currents will be established in said medium responsive to the conductivity thereof, a receiver means axially disposed apart from said transmitter means for producing a voltage induced by said flux field and also by a secondary flux field established by said eddy current, a detection means for detecting only that component of the receiver voltage representative of said secondary flux field, said detection means comprising, a first means in connection with said receiver means and a first measuring terminal for superimposing said receiver voltage as an alternating ripple on a direct current voltage including means for preventing current flow toward said receiver means, a second means in connection with said receiver means and a second measuring terminal for passing only that direct current voltage including means to prevent current flow toward said receiver means, said first and second measuring terminals being respectively connected through resistances to a current return, a source of alternating current voltage of like frequency, a preselected phase relation and greater amplitude than said receiver voltage, a third and fourth means connected to said source and respectively connected to said first and second measuring terminals including means to prevent current flow toward said source, whereby current will flow to said terminals from said receiver means during negative alternation of said source voltage and will cease to flow during the positive alternation of said source voltage, and means connected across said terminals for producing a voltage of amplitude representative of the average voltage of the receiver voltage component found across said measuring terminals.

5. A detection system for detecting a selected component of a received composite voltage comprising, means in connection with a source of said composite voltage and a first circuit for superimposing said composite voltage as an alternating ripple on a direct current voltage, said first circuit having a first and a second branch in respective connection with a first and second measuring terminal, a first and second resistance respectively connected between said terminals and a current return, a first and second rectifier means respectively connected into said first and second branches for passing current in one direction of flow, a filtering means connected into said second branch for filtering out said superimposed composite voltage, a second circuit in connection with a source of alternating current voltage of like frequency and preselected phase relation to said composite voltage, said second circuit having a third and a fourth branch in respective connection with said measuring terminals, a third and a fourth rectifying means respectively connected in said third and fourth branches for passing current in one direction of flow, and means connected across said terminals for producing a voltage representative of said component of said composite voltage.

6. A detection means for detecting a selected component of a composite voltage, said detection means comprising, a first means in connection with a source of said composite voltage and a first measuring terminal for superimposing said composite voltage as an alternating ripple on a direct current voltage including means for preventing current flow toward said source, a second means in connection with said composite voltage source and a second measuring terminal for passing only said direct current voltage including means to prevent current flow toward said source, said first and second measuring terminals being respectively connected through resistances to a current return, a source of alternating current voltage of like frequency, preselected phase relation and greater amplitude than said composite voltage, a third and fourth means connected to said source voltage and respectively connected to said first and second measuring terminals including means to prevent current flow toward said source, whereby current will flow to said terminals from said composite voltage source during negative alternation of said source voltage and will cease to flow during the positive alternation of said source voltage, and means connected across said terminals for producing a voltage of amplitude representative of the average voltage of the composite voltage component found across said measuring terminals.

7. A detection and modulation system for detecting a selected component of a received composite voltage and for modulating the center frequency of a frequency modulation transmission means, said detection and modulation means comprising, means in connection with said composite voltage and a first circuit for superimposing said composite voltage as an alternating ripple on a direct current voltage, said first circuit having a first and a second branch in respective connection with a first and second measuring terminal, a first and second resistance respectively connected between said terminals and a current return, a first and second rectifier means respectively connected into said first and second branches for passing current in one direction of flow, a filtering means connected into said second branch for filtering out said superimposed composite voltage, a second circuit in connection with a source of alternating current voltage of like frequency and preselected phase relation to said receiver voltage and with a source of alternating voltage of preselected amplitude and frequency proper for modulating said transmission means, said second circuit having a third and a fourth branch in respective connection with said measuring terminals, a third and a fourth rectifying means respectively connected in said third and fourth branches for passing current in one direction of flow, and means connected across said terminals and in connection with said transmission means for producing a voltage of amplitude representative of the average component voltage of receiver frequency and of frequency of said modulating voltage.

8. A detection and modulation means for detecting a selected component of a received composite voltage and for modulating the center frequency of a frequency modulation transmission means in response thereto, said detection and modulation means comprising, a first means in connection with a source of said composite voltage and a first measuring terminal for superimposing said composite voltage as an alternating ripple on a direct current voltage including means for preventing current flow toward said source, a second means in connection with said composite voltage source and a second measuring terminal for passing only said direct current voltage including means to prevent current flow toward said source, said first and second measuring terminals being respectively connected through resistances to a current return, a first source of alternating current voltage of like frequency, preselected phase relation and greater amplitude than said composite voltage, a second source of alternating current voltage of frequency proper for modulating said transmission means, a third and fourth means connected to both said voltage sources and respectively connected to said first and second measuring terminals including means to prevent current flow toward said sources, whereby current will flow to said terminals from said composite voltage source during negative alternation of both said source voltages and will cease to flow during the positive alternation of either of said sources, and means connected across said terminals and in connection with said transmission means for producing a voltage of modulating frequency and of amplitude representative of the average voltage of the composite voltage component found across said measuring terminals.

References Cited in the file of this patent
UNITED STATES PATENTS

| | | |
|---|---|---|
| 2,542,057 | Relis | Feb. 20, 1951 |
| 2,573,133 | Greer | Oct. 30, 1951 |
| 2,608,602 | Muffly | Aug. 26, 1952 |